United States Patent
Zhang et al.

(10) Patent No.: US 10,448,430 B2
(45) Date of Patent: Oct. 15, 2019

(54) GROUP BASED RANDOM ACCESS METHOD DEVICE AND SYSTEM

(71) Applicant: ZTE Corporation, Shenzhen (CN)

(72) Inventors: Wen Zhang, Shenzhen (CN); Shuqiang Xia, Shenzhen (CN); Bo Dai, Shenzhen (CN); Qian Dai, Shenzhen (CN); Zhaohua Lu, Shenzhen (CN); Kun Liu, Shenzhen (CN); Xianming Chen, Shenzhen (CN); Jing Shi, Shenzhen (CN); Xincai Li, Shenzhen (CN); Huiying Fang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/738,233

(22) PCT Filed: May 13, 2016

(86) PCT No.: PCT/CN2016/082087
§ 371 (c)(1),
(2) Date: Dec. 20, 2017

(87) PCT Pub. No.: WO2016/206497
PCT Pub. Date: Dec. 29, 2016

(65) Prior Publication Data
US 2018/0184461 A1    Jun. 28, 2018

(30) Foreign Application Priority Data
Jun. 26, 2015    (CN) .......................... 2015 1 0368321

(51) Int. Cl.
*H04W 4/00*    (2018.01)
*H04W 74/08*    (2009.01)
(Continued)

(52) U.S. Cl.
CPC ..... *H04W 74/0833* (2013.01); *H04W 72/042* (2013.01); *H04W 72/044* (2013.01);
(Continued)

(58) Field of Classification Search
CPC .................................................. H04W 74/0833
See application file for complete search history.

(56) References Cited

U.S. PATENT DOCUMENTS 9,560,675 B2 *    1/2017    Webb ................ H04W 74/0833
2013/0114494 A1    5/2013    Yuk
(Continued)

FOREIGN PATENT DOCUMENTS

| CN | 101365220 A | 2/2009 |
|---|---|---|
| CN | 102209391 A | 10/2011 |

(Continued)

OTHER PUBLICATIONS

International Search Report in international application No. PCT/CN2016/082087, dated Jul. 26, 2016, 2 pgs.
(Continued)

*Primary Examiner* — Gerald A Smarth
(74) *Attorney, Agent, or Firm* — McDonald Hopkins LLC

(57) ABSTRACT

A random access method comprises: transmitting, by a firstuser equipment (UE) in a UE group, and according to a time-frequency resource, a preamble to an evolved node B (eNB); and monitoring, by a second UE in the UE group and/or the first UE, for a random access response (RAR) corresponding to the preamble transmitted by the eNB, wherein the first UE is at least one UE in the UE group, and the second UE is all or a part of the UEs in the UE group.

18 Claims, 8 Drawing Sheets

(51) Int. Cl.
*H04W 72/04* (2009.01)
*H04W 72/14* (2009.01)
*H04W 76/27* (2018.01)
*H04L 29/08* (2006.01)
*H04W 88/02* (2009.01)

(52) U.S. Cl.
CPC ............ *H04W 72/14* (2013.01); *H04W 74/08* (2013.01); *H04L 69/324* (2013.01); *H04W 76/27* (2018.02); *H04W 88/02* (2013.01)

(56) References Cited

U.S. PATENT DOCUMENTS

| | | | |
|---|---|---|---|
| 2013/0155894 A1 | 6/2013 | Li et al. | |
| 2013/0155994 A1 | 6/2013 | Yoshizawa | |
| 2013/0279412 A1* | 10/2013 | Webb | H04W 74/0833 370/328 |
| 2014/0133430 A1 | 5/2014 | Yang | |
| 2014/0233528 A1* | 8/2014 | Webb | H04W 72/04 370/330 |
| 2014/0269283 A1 | 9/2014 | Shaheen | |
| 2014/0307611 A1* | 10/2014 | Tesanovic | H04W 76/14 370/312 |
| 2014/0349645 A1* | 11/2014 | Webb | H04L 5/0091 455/435.1 |
| 2015/0271791 A1 | 9/2015 | Webb et al. | |
| 2016/0227554 A1 | 8/2016 | Zhou et al. | |

FOREIGN PATENT DOCUMENTS

| | | |
|---|---|---|
| CN | 102378302 A | 3/2012 |
| CN | 102595633 A | 7/2012 |
| CN | 102917433 A | 2/2013 |
| CN | 103141147 A | 6/2013 |
| CN | 103491622 A | 1/2014 |
| CN | 103491643 A | 1/2014 |
| WO | 2014096766 A | 6/2014 |
| WO | 2015051857 A1 | 4/2015 |

OTHER PUBLICATIONS

English Translation of the Written Opinion of the International Search Authority in international application No. PCT/CN2016/082087, dated Jul. 26, 2016, 7 pgs.

Supplementary European Search Report in European application No. 16813613.3, dated May 16, 2018, 8 pgs.

* cited by examiner

GROUP BASED RANDOM ACCESS METHOD DEVICE AND SYSTEM

TECHNICAL FIELD

The present disclosure relates to, but not limited to the field of communications, and in particular to a random access method, device and system.

BACKGROUND

A Machine Type Communication (MTC) User Equipment (UE or terminal) is also referred to as a Machine to Machine (M2M) user communication device, which is a main application form of a current internet of things.

Recently, due to high spectral efficiency of a Long-Term Evolution (LTE)/Long-Term Evolution Advance (LTE-Advance or LTE-A) system, more and more mobile operators select the LTE/LTE-A as an evolution direction of a broadband wireless communication system. LTE/LTE-A based MTC multi-type data services will be more attractive.

In the LTE system, a random access is a basic function, and a UE can be scheduled by the system to perform uplink transmission only after uplink synchronization with the system via a random access process. The random access in the LTE is divided into two forms namely a contention-based random access and a contention-free random access.

An initial random access process is a contention-based access process, which can be divided into four steps.

(1) A UE sends a preamble, and the UE randomly selects an available preamble to be sent.

(2) An evolved Node B (eNB, also referred to as an evolved base station) sends a Random Access Response (RAR). When the eNB detects a preamble sequence sent by the UE, a response will be sent over a Downlink-Synchronization Channel (DL-SCH), the response including: an index number of the detected preamble, time adjustment information for uplink synchronization, initial uplink resource allocation (used for sending a subsequent message 3), and a Temporary Cell Radio Network Temporary Identity (TC-RNTI). It will be decided whether the TC-RNTI is converted into a permanent C-RNTI in Step (4) (contention resolution). The UE needs to monitor an RAR message over a Physical Downlink Control Channel (PDCCH) by using a Random Access RNTI (RA-RNTI).

$$RA\text{-}RNTI = 1 + t\_id + 10 * f\_id,$$

where t_id refers to an index number of a first subframe of a Physical Random Access Channel (PRACH) for sending a preamble ($0 \leq t\_id < 10$), f_id is a PRACH index in this subframe, i.e., a frequency domain position index ($0 \leq f\_id \leq 6$), but there is only one frequency domain position for a Frequency Division Duplexing (FDD) system, and therefore f_id is always zero.

(3) The UE sends the message 3. After receiving the RAR message, the UE obtains uplink time synchronization and uplink resources. However, at this time, it cannot be determined that the RAR message is sent to the UE itself instead of other UEs. The preamble sequence of the UE is randomly selected from common resources, thereby making it possible for different UEs to send the same access preamble sequence over the same time-frequency resource. Thus, they will receive the same RAR via the same RA-RNTI. Moreover, the UE is unable to know whether other UEs make a random access by using the same resource. For this purpose, the UE needs to resolve such a random access contention via the subsequent message 3 and message 4.

(4) The eNB sends the message 4, namely a contention resolution message. If the UE receives the message 4 returned by the eNB and a UE Identifier (ID) carried therein conforms to an ID reported to the eNB in the message 3 within the time of a mac-Contention Resolution Timer, the UE considers that it wins this random access contention and the random access is successful, and sets the TC-RNTI obtained in the RAR message as an own C-RNTI. Otherwise, the UE considers that the random access is unsuccessful, and executes a random access retransmission process in accordance with the above-mentioned rule.

As for the contention-free random access, the preamble sent by the UE is notified by the eNB, uplink synchronization is completed via the first two steps, and a contention resolution process is not executed.

Future communication requirements for a huge number of machine devices are as follows. A random access concurrent transmission blocking rate is smaller than 0.1%, and the access density within 1 s to 10 s is not smaller than 10 UEs per square meter. So, at least tens of thousands of UEs are accessed to a micro cell within 1 s to 10 s. In order to meet this demand, even if UEs are uniformly accessed and each subframe can initiate a random access, at least hundreds of times of PRACH resources are needed in accordance with a random access mode in the related art. However, actually, the UEs are not uniformly accessed. Therefore, more resources may be needed. In a conventional LTE system, if one time-frequency resource receives 64 cyclic shifts of one preamble root sequence, resources are insufficient for a system having a bandwidth of 20 Mbps even though all bandwidths are used to send the PRACH.

SUMMARY

The following is a brief introduction for a subject described herein in detail. The brief introduction is not intended to restrict the scope of protection of claims.

The disclosure provides a random access method, device and system, intended to save PRACH resources and meet requirements for a huge number of machine communications.

The embodiments of the disclosure provide a random access method. The method includes the steps as follows.

A first UE in a UE group sends a preamble to an eNB over a time-frequency resource, the time-frequency resource including a time domain resource and a frequency domain resource.

The first UE and/or a second UE in the UE group monitor(s) an RAR corresponding to the preamble and sent by the eNB, herein the first UE is at least one UE in the UE group, and the second UE is all or some UEs in the UE group.

In an embodiment, the first UE is at least one of the following:

at least one fixed UE; or,
at least one UE determined according to a pre-set rule; or,
at least one UE notified by the eNB.

In an embodiment, the preamble and/or the time domain resource and/or the frequency domain resource are/is pre-set, or determined by a group ID of the UE group, or notified by the eNB.

In an embodiment, the operation that the first UE and/or the second UE monitor(s) an RAR corresponding to the preamble and sent by the eNB includes the following operations.

The first UE and/or the second UE descramble(s) a Cyclic Redundancy Check (CRC) of Downlink Control Information (DCI) for scheduling the RAR according to a pre-set RA-RNTI or an RA-RNTI corresponding to the preamble, and receive(s) the RAR, the RAR including at least one TC-RNTI and/or at least one Uplink (UL) grant.

The first UE and/or the second UE determine(s) a TC-RNTI and/or UL grant allocated thereto according to at least one TC-RNTI and/or at least one UL grant included in the RAR.

In an embodiment, the operation that the first UE and/or the second UE determine(s) a TC-RNTI and/or a UL grant allocated thereto according to at least one TC-RNTI and/or at least one UL grant included in the RAR includes the following operation.

The first UE and/or the second UE determine(s) a TC-RNTI and/or a UL grant allocated thereto according to an ID of the first UE and/or the second UE in accordance with a pre-set rule.

In an embodiment, the operation that the first UE and/or the second UE monitor(s) an RAR corresponding to the preamble and sent by the eNB includes the following operation.

The first UE and/or the second UE determine(s) corresponding RA-RNTIs according to respective IDs and/or preambles, descramble(s) a CRC of DCI for scheduling the RAR according to the corresponding RA-RNTIs, and receive(s) corresponding RARs, the RAR including a TC-RNTI and/or a UL grant allocated to the first UE or second UE.

In an embodiment, after the first UE and/or the second UE monitor(s) an RAR corresponding to the preamble and sent by the eNB, the method further includes the step as follows.

The first UE and/or the second UE send(s) a message 3 according to the UL grant allocated thereto.

In an embodiment, after the first UE and/or the second UE send(s) a message 3 according to the UL grant allocated thereto, the method further includes the step as follows.

The first UE and/or the second UE receive(s) a message 4 sent by the eNB.

In an embodiment, the operation that the first UE and/or the second UE receive(s) a message 4 sent by the eNB includes the following operation.

A CRC of DCI for scheduling the message 4 is scrambled by using the TC-RNTI allocated to the first UE and/or the second UE.

In an embodiment, the message 4 includes at least one set of radio resources, radio resources allocated to the first UE and/or the second UE determined by the first UE and/or the second UE according to at least one set of radio resources in the message 4.

In an embodiment, the radio resources allocated to the first UE and/or the second UE are further determined by the UE according to an ID of the first UE and/or the second UE in accordance with a pre-set rule.

In an embodiment, the message 4 includes:

a set of radio resources allocated to the first UE or second UE.

In an embodiment, after the first UE and/or the second UE receive(s) a message 4 sent by the eNB, the method further includes the step as follows.

The first UE and/or the second UE send(s), to the eNB, an indicating signal for notifying the eNB of a successful access of the first UE and/or the second UE.

In an embodiment, the indicating signal is a Scheduling Request (SR) or an Acknowledgement (ACK) signal.

In an embodiment, after the first UE and/or the second UE receive(s) a message 4 sent by the eNB, the method further includes the step as follows.

The first UE and/or the second UE receive(s) indicating information, sent by the eNB, for indicating re-initiation of a random access of the first UE and/or the second UE.

In an embodiment, before the first UE in the UE group sends a preamble over a time-frequency resource, the method further includes the steps as follows.

The first UE and/or the second UE receive(s) DCI or a paging message or a Radio Resource Control (RRC) message sent by the eNB.

Or, the first UE receives random access request information sent by the second UE.

In an embodiment, the operation that the first UE and/or the second UE receive(s) DCI or a paging message or an RRC message sent by the eNB includes at least one of the following operations.

The DCI or a CRC of DCI for scheduling the paging message or the RRC message is scrambled by using a group ID of the UE group.

The DCI or the paging message or the RRC message includes a group ID of the UE group.

The DCI or the paging message or the RRC message includes an ID of the first UE and/or the second UE.

The DCI or the paging message or the RRC message includes an ID of a preamble and/or a time domain resource of a preamble and/or a frequency domain resource of a preamble.

In an embodiment, after the first UE receives random access request information sent by the second UE, the method further includes the steps as follows.

The first UE counts received random access requests of the second UE in the group.

When a count reaches a pre-set threshold, the first UE sends a preamble over a time-frequency resource.

In an embodiment, the operation that the first UE in the UE group sends a preamble over a time-frequency resource includes the following operation.

The first UE sends a preamble over a frequency domain resource periodically.

In an embodiment, the message 3 and the message 4 include the group ID of the UE group or a pre-set field.

In an embodiment, the message 3 includes a number of UEs having random access requests in the UE group or a number of UEs contained in the UE group or a pre-set UE number.

In an embodiment, the preamble and/or the time domain resource and/or the frequency domain resource correspond(s) to the number of UEs having random access requests in the UE group or the number of UEs contained in the UE group or the pre-set UE number.

The embodiments of the disclosure also provide a random access method. The method includes the steps as follows.

An eNB receives a preamble sent by a first UE in a UE group over a time-frequency resource, herein the time-frequency resource includes a time domain resource and a frequency domain resource, and the first UE is at least one UE in the UE group.

The eNB sends an RAR corresponding to the preamble.

In an embodiment, the RAR includes at least one TC-RNTI and/or at least one UL grant, the RAR is used for the first UE and/or the second UE to determine a TC-RNTI and/or UL grant allocated thereto from at least one TC-RNTI and/or UL grant according to an ID of the first UE and/or the second UE in accordance with a pre-set allocation rule, and the second UE is all or some UEs in the UE group.

In an embodiment, the RAR includes a TC-RNTI and/or a UL grant allocated to the first UE or second UE, and the second UE is all or some UEs in the UE group.

In an embodiment, after the eNB sends an RAR corresponding to the preamble, the method further includes the step as follows.

The eNB receives a message 3 sent by the first UE and/or the second UE according to the UL grant allocated thereto.

In an embodiment, after the eNB receives a message 3 sent by the first UE and/or the second UE according to the UL grant allocated thereto, the method further includes the step as follows.

The eNB sends a message 4 to the first UE and/or the second UE.

In an embodiment, the operation that the eNB sends a message 4 to the first UE and/or the second UE includes the following operation: a CRC of DCI for scheduling the message 4 is scrambled by using the TC-RNTI allocated to the first UE and/or the second UE.

In an embodiment, the message 4 includes at least one set of radio resources, radio resources allocated to the first UE and/or the second UE determined by the first UE and/or the second UE according to at least one set of radio resources included in the message 4.

In an embodiment, the message 4 includes:
a set of radio resources allocated to the first UE or second UE.

In an embodiment, after the eNB sends a message 4 to the first UE and/or the second UE, the method further includes the step as follows.

The eNB receives an indicating signal, sent by the first UE and/or the second UE, for notifying the eNB of a successful access of the first UE and/or the second UE, the indicating signal being an SR or an ACK signal.

In an embodiment, after the eNB sends a message 4 to the first UE and/or the second UE, the method further includes the step as follows.

The eNB sends, to the first UE and/or the second UE, indicating information for indicating re-initiation of a random access of the first UE and/or the second UE.

In an embodiment, before the eNB receives a preamble sent by a first UE in a UE group over a time-frequency resource, the method further includes the step as follows.

The eNB sends DCI or a paging message or an RRC message to the first UE and/or the second UE.

In an embodiment, the operation that the eNB sends DCI or a paging message or an RRC message to the first UE and/or the second UE includes at least one of the following operations.

The DCI or a CRC of DCI for scheduling the paging message or the RRC message is scrambled by using a group ID of the UE group.

The DCI or the paging message or the RRC message includes a group ID of the UE group.

The DCI or the paging message or the RRC message includes an ID of the first UE and/or the second UE.

The DCI or the paging message or the RRC message includes an ID of a preamble and/or a time domain resource of a preamble and/or a frequency domain resource of a preamble.

In an embodiment, the operation that the eNB receives a preamble sent by the first UE in the UE group over a time-frequency resource includes the following operation.

The eNB receives a preamble sent by the first UE over a frequency domain resource periodically.

In an embodiment, the message 3 and the message 4 include the group ID of the UE group or a pre-set field.

In an embodiment, the message 3 includes a number of UEs having random access requests in the UE group or a number of UEs contained in the UE group.

The embodiments of the disclosure also provide a computer-readable storage medium, which stores a computer-executable instruction, herein when the computer-executable instruction is executed, the above-mentioned random access method is implemented.

The embodiments of the disclosure also provide a UE. The UE includes: a sending unit and a monitoring unit, herein the sending unit is configured to: send a preamble to an eNB over a time-frequency resource, the time-frequency resource including a time domain resource and a frequency domain resource; and the monitoring unit is configured to: monitor an RAR corresponding to the preamble and sent by the eNB.

In an embodiment, the monitoring unit includes: a first descrambling subunit, a first receiving subunit and an allocation subunit, herein the first descrambling subunit is configured to: descramble a CRC of DCI for scheduling the RAR according to a pre-set RA-RNTI or an RA-RNTI corresponding to the preamble;

the first receiving subunit is configured to: receive the RAR, the RAR including at least one TC-RNTI and/or at least one UL grant; and the allocation subunit is configured to: determine a TC-RNTI and/or UL grant allocated to the UE according to at least one TC-RNTI and/or at least one UL grant included in the RAR.

In an embodiment, the allocation subunit is configured to: determine a TC-RNTI and/or a UL grant allocated to the UE according to an ID of the UE in accordance with a pre-set rule.

In an embodiment, the monitoring unit includes: a determination subunit, a second descrambling subunit and a second receiving subunit, herein the determination subunit is configured to: determine corresponding RA-RNTIs of the UE according to respective IDs and/or preambles of the UE;

the second descrambling subunit is configured to: descramble a CRC of DCI for scheduling the RAR according to the corresponding RA-RNTIs of the UE; and the second receiving subunit is configured to: receive corresponding RARs of the UE, the RAR including a corresponding TC-RNTI and/or UL grant allocated to the UE.

In an embodiment, the sending unit is further configured to: send a message 3 according to the UL grant allocated to the UE.

In an embodiment, the UE further includes a receiving unit, configured to: receive a message 4 sent by the eNB.

In an embodiment, receiving a message 4 sent by the eNB includes:

scrambling a CRC of DCI for scheduling the message 4 by using the TC-RNTI allocated to a first UE and/or a second UE.

In an embodiment, the message 4 includes at least one set of radio resources for the UE to determine radio resources allocated to the UE.

In an embodiment, the message 4 includes:
a set of radio resources allocated to the corresponding UE.

In an embodiment, the sending unit is further configured to: send, to the eNB, an indicating signal for notifying the eNB of a successful access of the UE.

In an embodiment, the indicating signal is an SR or an ACK signal.

In an embodiment, the receiving unit is further configured to: receive indicating information, sent by the eNB, for indicating re-initiation of a random access of the UE.

In an embodiment, the receiving unit is further configured to: receive DCI or a paging message or an RRC message sent by the eNB; or, receive random access request information sent by the second UE.

In an embodiment, receiving DCI or a paging message or an RRC message sent by the eNB includes at least one of the following:

the DCI or a CRC of DCI for scheduling the paging message or the RRC message is scrambled by using a group ID of a UE group;

the DCI or the paging message or the RRC message includes the group ID of the UE group;

the DCI or the paging message or the RRC message includes an ID of the first UE and/or the second UE; and the DCI or the paging message or the RRC message includes an ID of a preamble and/or a time domain resource of a preamble and/or a frequency domain resource of a preamble.

In an embodiment, the sending unit is configured to: send a preamble over a frequency domain resource periodically.

In an embodiment, the message 3 and the message 4 include the group ID of the UE group or a pre-set field.

In an embodiment, the message 3 includes a number of UEs having random access requests in the UE group or a number of UEs contained in the UE group or a pre-set UE number.

In an embodiment, the preamble and/or the time domain resource and/or the frequency domain resource correspond(s) to the number of UEs having random access requests in the UE group or the number of UEs contained in the UE group or the pre-set UE number.

The embodiments of the disclosure also provide an eNB. The eNB includes: a receiving unit and a sending unit, herein the receiving unit is configured to: receive a preamble sent by a first UE in a UE group over a time-frequency resource, herein the time-frequency resource includes a time domain resource and a frequency domain resource, and the first UE is at least one UE in the UE group; and the sending unit is configured to: send an RAR corresponding to the preamble.

In an embodiment, the RAR includes at least one TC-RNTI and/or at least one UL grant, the RAR is used for the first UE and/or the second UE to determine a TC-RNTI and/or UL grant allocated thereto from at least one TC-RNTI and/or UL grant according to an ID of the first UE and/or the second UE in accordance with a pre-set allocation rule, and the second UE is all or some UEs in the UE group.

In an embodiment, the RAR includes a TC-RNTI and/or a UL grant allocated to the first UE or second UE, and the second UE is all or some UEs in the UE group.

In an embodiment, the receiving unit is further configured to: receive a message 3 sent by the first UE and/or the second UE according to the UL grant allocated thereto.

In an embodiment, the sending unit is further configured to: send a message 4 to the first UE and/or the second UE.

In an embodiment, sending a message 4 to the first UE and/or the second UE includes: scrambling a CRC of DCI for scheduling the message 4 by using the TC-RNTI allocated to the first UE and/or the second UE.

In an embodiment, the message 4 includes at least one set of radio resources for the first UE and/or the second UE to determine radio resources allocated thereto.

In an embodiment, the message 4 includes:

a set of radio resources allocated to the first UE or second UE.

In an embodiment, the receiving unit is further configured to: receive an indicating signal, sent by the first UE and/or the second UE, for notifying the eNB of a successful access of the first UE and/or the second UE, the indicating signal being an SR or an ACK signal.

In an embodiment, the sending unit is further configured to: send, to the first UE and/or the second UE, indicating information for indicating re-initiation of a random access of the first UE and/or the second UE.

In an embodiment, the sending unit is further configured to: send DCI or a paging message or an RRC message to the first UE and/or the second UE.

In an embodiment, sending DCI or a paging message or an RRC message to the first UE and/or the second UE includes at least one of the following:

the DCI or a CRC of DCI for scheduling the paging message or the RRC message is scrambled by using a group ID of the UE group;

the DCI or the paging message or the RRC message includes a group ID of the UE group;

the DCI or the paging message or the RRC message includes an ID of the first UE and/or the second UE; and the DCI or the paging message or the RRC message includes an ID of a preamble and/or a time domain resource of a preamble and/or a frequency domain resource of a preamble.

In an embodiment, the receiving unit is configured to: receive a preamble sent by the first UE over a frequency domain resource periodically.

In an embodiment, the message 3 and the message 4 include the group ID of the UE group or a pre-set field.

In an embodiment, the message 3 includes a number of UEs having random access requests in the UE group or a number of UEs contained in the UE group.

The embodiments of the disclosure also provide a random access system. The system includes a UE and an eNB, herein a first UE in a UE group is configured to: send a preamble to the eNB over a time-frequency resource, the time-frequency resource including a time domain resource and a frequency domain resource;

the first UE and/or a second UE in the UE group are/is configured to: monitor an RAR corresponding to the preamble and sent by the eNB, herein the first UE is at least one UE in the UE group, and the second UE is all or some UEs in the UE group; and the eNB is configured to: receive the preamble sent by the first UE in the UE group over the time-frequency resource, and send the RAR corresponding to the preamble.

The embodiments of the disclosure provide a random access method, device and system. One or more UEs in a UE group send a preamble to an eNB over a time-frequency resource, so as to instruct the eNB to execute random accesses of some or all UEs in the UE group. Thus, a group of UEs only needs to occupy a PRACH resource (including a time domain resource, a frequency domain resource and a preamble) in a random access, so that PRACH resources can be greatly saved, thereby meeting requirements for a huge number of machine communications.

After the drawings and the detailed descriptions are read and understood, other aspects may be understood.

DETAILED DESCRIPTION

The detailed description will be made hereinbelow in conjunction with the drawings. It is important to note that the embodiments in the present disclosure and various modes in the embodiments can be combined without conflicts.

First Embodiment

Figure 1:
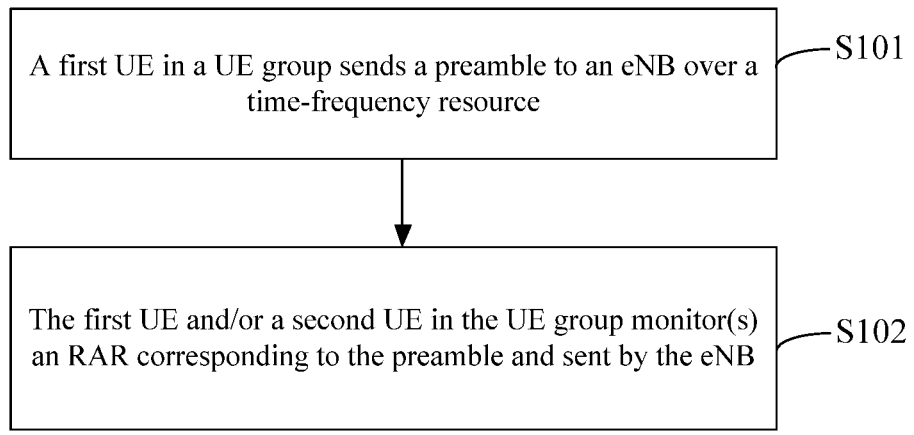
FIG. 1 shows a flowchart of a random access method according to an embodiment of the disclosure.

FIG. 1 shows a flow of a random access method according to an embodiment of the disclosure. The method may be applied to a UE side and may include the steps as follows.

In S101, a first UE in a UE group sends a preamble to an eNB over a time-frequency resource, the time-frequency resource including a time domain resource and a frequency domain resource.

In S102: the first UE and/or a second UE in the UE group monitor(s) an RAR corresponding to the preamble and sent by the eNB.

Herein, the first UE may be at least one UE in the UE group, and the first UE can be representative of the UE group. The second UE may be all or some UEs in the UE group, i.e., UEs having random access requests. Therefore, the second UE may include the first UE.

It is important to note that the first UE may be at least one of the following:

at least one fixed UE; or, at least one UE determined according to a pre-set rule; or, at least one UE notified by the eNB.

Moreover, the preamble and/or the time domain resource and/or the frequency domain resource may be pre-set, or may be determined by a group ID of the UE group, or may be notified by the eNB.

In an embodiment, the operation that the first UE and/or the second UE monitor(s) an RAR corresponding to the preamble and sent by the eNB may include the following operations.

The first UE and/or the second UE descramble(s) a CRC of DCI for scheduling the RAR according to a pre-set RA-RNTI or an RA-RNTI corresponding to the preamble, and receive(s) the RAR, the RAR including at least one TC-RNTI and/or at least one UL grant.

The first UE and/or the second UE determine(s) a TC-RNTI and/or UL grant allocated thereto according to at least one TC-RNTI and/or at least one UL grant included in the RAR. In an embodiment, the first UE and/or the second UE may determine a TC-RNTI and/or a UL grant allocated thereto according to an ID of the first UE and/or the second UE in accordance with a pre-set rule.

In an embodiment, the operation that the first UE and/or the second UE monitor(s) an RAR corresponding to the preamble and sent by the eNB may include the following operation.

The first UE and/or the second UE determine(s) corresponding RA-RNTIs according to respective IDs and/or preambles, descramble(s) a CRC of DCI for scheduling the RAR according to the corresponding RA-RNTIs, and receive(s) corresponding RARs, the RAR including a TC-RNTI and/or a UL grant allocated to the first UE or second UE.

Exemplarily, after the first UE and/or the second UE monitor(s) an RAR corresponding to the preamble and sent by the eNB, the method may further include the step as follows.

The first UE and/or the second UE send(s) a message 3 according to the UL grant allocated thereto.

In an embodiment, after the first UE and/or the second UE send(s) a message 3 according to the UL grant allocated thereto, the method may further include the step as follows.

The first UE and/or the second UE receive(s) a message 4 sent by the eNB.

It is important to note that the operation that the first UE and/or the second UE receive(s) a message 4 sent by the eNB may include the following operation: a CRC of DCI for scheduling the message 4 is scrambled by using the TC-RNTI allocated to the first UE and/or the second UE.

In an embodiment, the message 4 may include at least one set of radio resources, and the first UE and/or the second UE may determine radio resources allocated thereto according to at least one set of radio resources included in the message 4. In an embodiment, the UE may also determine the radio resources allocated thereto according to an ID of the UE in accordance with a pre-set rule.

In an embodiment, the message 4 may also include a set of radio resources allocated to the first UE or second UE.

In an embodiment, after the first UE and/or the second UE receive(s) a message 4 sent by the eNB, the method may further include the step as follows.

The first UE and/or the second UE send(s), to the eNB, an indicating signal for notifying the eNB of a successful access of the first UE and/or the second UE, herein the indicating signal may be an SR or an ACK signal.

In an embodiment, after the first UE and/or the second UE receive(s) a message 4 sent by the eNB, the method may further include the step as follows.

The first UE and/or the second UE receive(s) indicating information, sent by the eNB, for indicating re-initiation of a random access of the first UE and/or the second UE.

Exemplarily, before the first UE in the UE group sends a preamble over a time-frequency resource, the method may further include the steps as follows.

The first UE and/or the second UE receive(s) DCI or a paging message or an RRC message sent by the eNB.

Or, the first UE receives random access request information sent by the second UE.

In an embodiment, the operation that the first UE and/or the second UE receive(s) DCI or a paging message or an RRC message sent by the eNB may include at least one of the following operations.

The DCI or a CRC of DCI for scheduling the paging message or the RRC message is scrambled by using a group ID of the UE group.

The DCI or the paging message or the RRC message includes a group ID of the UE group.

The DCI or the paging message or the RRC message includes an ID of the first UE and/or the second UE.

The DCI or the paging message or the RRC message includes an ID of a preamble and/or a time domain resource of a preamble and/or a frequency domain resource of a preamble.

In an embodiment, after the first UE receives random access request information sent by the second UE, the method may further include the steps as follows.

The first UE counts received random access requests of the second UE in the group.

When a count reaches a pre-set threshold, the first UE sends a preamble over a time-frequency resource.

Exemplarily, the operation that the first UE in the UE group sends a preamble over a time-frequency resource may include the following operation.

The first UE sends a preamble over a frequency domain resource periodically.

It is important to note that the message 3 and the message 4 may include the group ID of the UE group or a pre-set field.

Moreover, the message 3 may include a number of UEs having random access requests in the UE group or a number of UEs contained in the UE group or a pre-set UE number.

In an embodiment, the preamble and/or the time domain resource and/or the frequency domain resource may correspond to the number of UEs having random access requests in the UE group or the number of UEs contained in the UE group or the pre-set UE number.

The present embodiment provides a random access method. A first UE in a UE group sends a preamble to an eNB over a time-frequency resource, and then the first UE and/or a second UE in the UE group monitor(s) an RAR corresponding to the preamble and sent by the eNB, and UL grant and resource allocation are completed. Thus, a group of UEs only needs to occupy a PRACH resource (including a time domain resource, a frequency domain resource and a preamble) in a random access, so that PRACH resources can be greatly saved, thereby meeting requirements for a huge number of machine communications.

Second Embodiment

Figure 2:
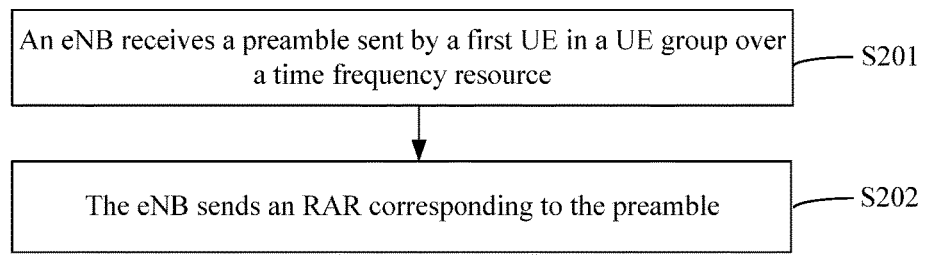
FIG. 2 shows a flowchart of another random access method according to an embodiment of the disclosure.

FIG. 2 shows a flow of another random access method according to an embodiment of the disclosure. The method may be applied to an eNB side and may include the steps as follows.

In S201, an eNB receives a preamble sent by a first UE in a UE group over a time-frequency resource, herein the time-frequency resource includes a time domain resource and a frequency domain resource.

In S202, the eNB sends an RAR corresponding to the preamble.

In an embodiment, the RAR may include at least one TC-RNTI and/or at least one UL grant, and the RAR may be used for the first UE and/or the second UE to determine a TC-RNTI and/or UL grant allocated thereto from at least one TC-RNTI and/or UL grant according to an ID of the first UE and/or the second UE in accordance with a pre-set allocation rule.

In an embodiment, the RAR may include a TC-RNTI and/or a UL grant allocated to the first UE or second UE.

It is important to note that the first UE in S201 to S202 may be at least one UE in the UE group, and the first UE can be representative of the UE group. The second UE may be all or some UEs in the UE group, i.e., UEs having random access requests. Therefore, the second UE may include the first UE.

In an embodiment, after the eNB sends an RAR corresponding to the preamble, the method may further include the step as follows.

The eNB receives a message 3 sent by the first UE and/or the second UE according to the UL grant allocated thereto.

Moreover, after the eNB receives a message 3 sent by the first UE and/or the second UE according to the UL grant allocated thereto, the method may further include the step as follows.

The eNB sends a message 4 to the first UE and/or the second UE.

It is important to note that the operation that the eNB sends a message 4 to the first UE and/or the second UE may include the following operation: a CRC of DCI for scheduling the message 4 is scrambled by using the TC-RNTI allocated to the first UE and/or the second UE.

In an embodiment, the message 4 may include at least one set of radio resources, and the first UE and/or the second UE may determine radio resources allocated thereto according to at least one set of radio resources included in the message 4.

And/or, the message 4 may also include a set of radio resources allocated to the first UE or second UE.

In an embodiment, after the eNB sends a message 4 to the first UE and/or the second UE, the method may further include the step as follows.

The eNB receives an indicating signal, sent by the first UE and/or the second UE, for notifying the eNB of a successful access of the first UE and/or the second UE, the indicating signal being an SR or an ACK signal.

Or, after the eNB sends a message 4 to the first UE and/or the second UE, the method may further include the step as follows.

The eNB sends, to the first UE and/or the second UE, indicating information for indicating re-initiation of a random access of the first UE and/or the second UE.

Exemplarily, before the eNB receives a preamble sent by a first UE in a UE group over a time-frequency resource, the method may further include the step as follows.

The eNB sends DCI or a paging message or an RRC message to the first UE and/or the second UE.

In an embodiment, the operation that the eNB sends DCI or a paging message or an RRC message to the first UE and/or the second UE may include at least one of the following operations.

The DCI or a CRC of DCI for scheduling the paging message or the RRC message is scrambled by using a group ID of the UE group.

The DCI or the paging message or the RRC message includes a group ID of the UE group.

The DCI or the paging message or the RRC message includes an ID of the first UE and/or the second UE.

The DCI or the paging message or the RRC message includes an ID of a preamble and/or a time domain resource of a preamble and/or a frequency domain resource of a preamble.

In an embodiment, the operation that the eNB receives a preamble sent by the first UE in the UE group over a time-frequency resource may include the following operation.

The eNB receives a preamble sent by the first UE over a frequency domain resource periodically.

It is important to note that the message 3 and the message 4 may include the group ID of the UE group or a pre-set field.

Moreover, the message 3 may include a number of UEs having random access requests in the UE group or a number of UEs contained in the UE group.

The present embodiment provides a random access method. After receiving a preamble sent by a first UE in a UE group over a time-frequency resource, an eNB sends an RAR corresponding to the preamble, such that the UE completes UL grant and resource allocation. Thus, a group of UEs only needs to occupy a PRACH resource (including a time domain resource, a frequency domain resource and a preamble) in a random access, so that PRACH resources can be greatly saved, thereby meeting requirements for a huge number of machine communications.

Third Embodiment

On the basis of the same technical thought of the above-mentioned two embodiments, the present embodiment introduces the technical solutions of the above-mentioned two embodiments via the following four specific examples in detail. It is important to note that the following four examples are only used to illustrate the technical solutions of the embodiments of the disclosure, a person skilled in the art can combine the technical solutions of the four specific examples as required without creative work, and there is no elaboration in the embodiments of the disclosure.

In the following examples, multiple (two or more) UEs form a UE group, a group of UEs has a group ID serving as a group identifier, and each UE has an own intra-group ID number namely own identification information. A forming manner of the group may be one of the following manners:

(1) An operator configures fixed UEs installed by the operator or fixed UEs (such as vehicle-mounted UEs, or UEs in the same carriage of a train or a subway) with the same service at close relative positions as a group on an Operation Administration and Maintenance (OAM) background.

(2) A network side detects Time Advance (TA) values of all terminals in a connected state, and if the TA values of some terminals always keep the same within a period of time, these terminals are configured as a group.

(3) Some UEs within a shorter positioning distance are configured as a group by using a positioning system.

(4) Under the condition that UEs may communicate with one another, for example, UEs spontaneously form a group by utilizing a Device to Device (D2D) discovery technology. The spontaneously forming of a group of UEs is similar to "discovery" in a D2D technology in the related art. (Only applied to a situation that intra-group UEs may communicate)

EXAMPLE 1

Figure 3:
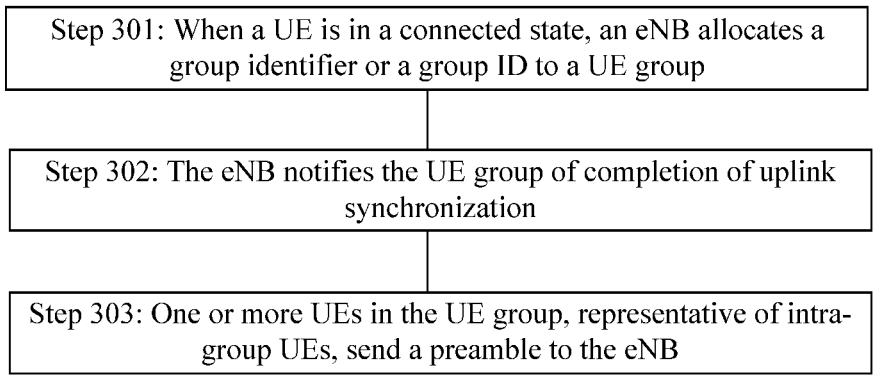
FIG. 3 shows a chart of a contention-free random access method according to an embodiment of the disclosure.

Example 1 gives a contention-free random access method. Referring to FIG. 3, the example includes the steps as follows.

In step 301, when a UE is in a connected state, an eNB allocates a group identifier or a group ID to a UE group, namely a group RNTI.

In step 302, the eNB notifies the UE group of completion of uplink synchronization.

The eNB notifies this group of UEs of random access to complete the uplink synchronization. Notification signaling may be physical layer signaling or may be high-layer signaling.

The physical layer signaling may be DCI, a CRC of the DCI being scrambled or masked by using the group RNTI. The scrambling or masking manner may be a manner of performing exclusive-or operation according to bits. For example, a group RNTI is 16-bit, a CRC is also 16-bit, and exclusive-or operation is performed between bits of corresponding positions therebetween. For another example, a group RNTI is "0000110100001111", and a CRC is "1111001111110011", so the CRC is scrambled by using the group RNTI to obtain "1111111011111100". Correspondingly, a UE receiving the scrambled CRC performs exclusive-or operation on the scrambled CRC and the group RNTI, so that a CRC not scrambled can be obtained.

The high-layer signaling may also be an RRC message. The high-layer signaling may be common information sent to the UE group or may be an RRC message sent to a UE, the RRC message being used to notify the UE group of access. For example, the UE group may be notified of access via a bit indicator in the RRC message.

In an embodiment, the notification signaling (DCI or RRC message) may only contain preamble-related information. For example, the notification signaling may contain index information of a preamble. Thus, after the notification signaling is received, a preamble to be sent may be determined according to the preamble-related information, and a time-frequency resource for sending the preamble may be pre-set, such as a fixed time-frequency resource pre-set by the UE group, or a time-frequency resource pre-appointed between the UE group and the eNB. Or, the notification signaling may also contain time domain resource information namely sending subframe information, used for instructing a UE in the UE group to send the preamble over the subframe. Thus, after the notification signaling is received, frequency domain information for sending the preamble may be pre-set, such as a fixed frequency domain resource pre-set by the UE group, or a frequency domain resource pre-appointed between the UE group and the eNB. Or, the notification signaling may contain preamble-related information and frequency domain resource information. Thus, after the notification signaling is received, subframe information for sending the preamble may be pre-set, such as a fixed time domain resource pre-set by the UE group, or a time domain resource pre-appointed between the UE group and the eNB. Or, the notification signaling may contain preamble-related information and time-frequency resource information (including time domain resource information and frequency domain resource information, the time domain resource information being subframe information). Or, the notification signaling may not include preamble-related information, time domain resource information and frequency domain resource information, and one or more UEs in the UE group, receiving the notification signaling, may directly send a preamble appointed with the eNB to the eNB via a pre-appointed time-frequency resource.

In step 303, one or more UEs in the UE group, representative of intra-group UEs, send a preamble to the eNB.

After receiving the notification signaling, a UE in the UE group sends a corresponding preamble (notified by the eNB, or pre-set or appointed) over a corresponding time-frequency resource (notified by the eNB, or pre-set or appointed).

In an embodiment, the UE for sending the preamble is a first UE, which may be one of the following:

(1) one or more fixed UEs, herein for example, a UE numbered as 0 is pre-specified to send a preamble, or a UE in the UE group, numbered as an even number, is pre-specified to send a preamble, or all UEs may be specified to send a preamble;

(2) a certain or some UEs determined in accordance with a pre-set rule, herein for example, a UE for sending a preamble is determined according to the number of a UE for sending a preamble and a subframe number of a subframe receiving physical layer signaling or high-layer signaling; for example, if an odd subframe receives the physical layer signaling or the high-layer signaling, a UE numbered as an odd number sends a preamble, and if an even subframe receives the physical layer signaling or the high-layer signaling, a UE numbered as an even number sends a preamble; and (3) one or more UEs specified in the notification signaling sent by the eNB, herein in this case, the physical layer signaling or the high-layer signaling also needs to contain number information of a UE initiating a random access.

After the UE sends a preamble, all UEs monitor an RAR, and a CRC of a PDCCH for scheduling the RAR is scrambled or masked by using an RA-RNTI, where the RA-RNTI may be pre-set, and is, for example, bound with the sending time of the preamble and the sent frequency domain resource (in FDD, only the sending time):

RA-RNTI=1+$t\_id$+10*$f\_id$

When a time-frequency resource is fixed, an RA-RNTI is also fixed. In this case, all UEs may monitor a PDCCH scrambled by the RA-RNTI to obtain an RAR.

Or, the time-frequency resource may not be fixed. For example, a frequency domain resource is fixed, but a time domain resource may not be fixed. This situation may occur in case of specifying one UE to send a preamble. At this time, the UE sending the preamble may monitor the sent time-frequency resource to calculate a PDCCH scrambled by the RA-RNTI, and other UEs may need to monitor all possible time-frequency resources so as to calculate a plurality of PDCCHs scrambled by the RA-RNTI.

After monitoring the PDCCH scrambled by the RA-RNTI, the UE may receive a Physical Downlink Shared Channel (PDSCH) scheduled by the UE, so as to obtain TA information.

A random access in the related art is independently completed by each UE. However, in the present example, a group of UEs only occupies a PRACH resource (including a time domain resource, a frequency domain resource and a preamble) in a random access, so that PRACH resources can be greatly saved.

EXAMPLE 2

Figure 4:
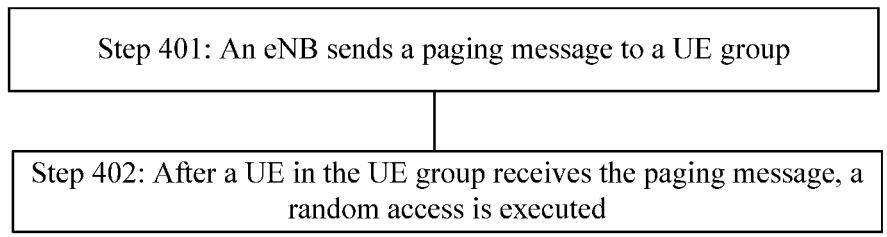
FIG. 4 shows a chart of a method for triggering access of a UE group in a manner that an eNB sends a paging message according to an embodiment of the disclosure.

Example 2 provides a method for triggering access of a UE group in a manner that an eNB sends a paging message. Referring to FIG. 4, the example includes the steps as follows.

In step 401, an eNB sends a paging message to a UE group.

In an embodiment, the paging message may be used to awaken all or some idle UEs in the UE group to initiate a random access.

The paging message may include at least one of the following:

(1) a group ID, where the group ID may be contained in the paging message, or the group ID may be adopted to scramble a CRC of a PDCCH for scheduling the paging message;

(2) the number of a UE initiating a random access, namely, UE-ID;

(3) a preamble ID, or where, the preamble ID may not be notified, namely, pre-set;

(4) a time domain and/or frequency domain resource, or where, the time domain and/or frequency domain resource may not be notified and pre-set, or the time domain resource may be pre-set and the frequency domain resource may be notified, or the frequency domain resource may be pre-set and the time domain resource may be notified; and (5) the numbers (UE-ID) of some intra-group UEs, where this information may be contained only when some UEs therein are awakened to initiate a random access.

When the above-mentioned paging message does not include the number of a UE initiating a random access, namely, UE-ID, the UE initiating the random access may be determined in the following manners:

a. specifying one or more UEs in the UE group to initiate a random access, herein for example, a UE numbered as 0 is pre-defined to send a preamble, or a UE numbered as an even number is pre-defined to send a preamble, or all UEs send a preamble; and b. determining one or more UEs to initiate a random access in accordance with a certain rule, herein for example, one or more UEs initiating a random access may be determined according to a correspondence between the number of a UE sending a preamble and a subframe receiving physical signal signaling or high-layer signaling; for example, if an odd subframe receives the signaling, a UE numbered as an odd number sends a preamble, and if an even subframe receives the signaling, a UE numbered as an even number sends a preamble.

It is important to note that one or more UEs initiating a random access, determined in the above-mentioned manners, may be identical to or different from a UE required to be awakened by the eNB. This difference may include: partial difference or total difference.

In step 402, after a UE in the UE group receives the paging message, a random access is executed.

Specifically, the random access may be implemented in the following three manners.

Manner 1:

In step 1, the one or more UEs initiating a random access send a preamble over the time-frequency resource.

In step 2, after receiving the preamble, the eNB sends an RAR, the RAR carrying a TA and at least one of the following information:

(1) TC-RNTI information, herein in an embodiment, the TC-RNTI information may include M TC-RNTIs, where M is the number of intra-group UEs, or the number of UE needing to be awakened, or a pre-set value; the M TC-RNTIs may be in a form of absolute value namely a 16 bit C-RNTI, or may be an absolute value of a C-RNTI and relative values of M−1 C-RNTIs relative to the absolute value, and all or some intra-group UEs needing to be awakened may correspond to different TC-RNTIs in accordance with a pre-set rule respectively, e.g., correspond in an ascending order of UE-ID or correspond randomly; or, the TC-RNTI information may be a TC-RNTI, and all or some intra-group UEs may correspond to TC-RNTI, TC-RNTI+1, TC-RNTI+2, . . . , TC-RNTI+M−1 in accordance with a pre-set rule respectively, e.g., correspond in an ascending order of UE-ID or correspond randomly;

(2) UL grant information, herein for example, the UL grant information may be M pieces of independent UL grant information or may be UL grant information containing M pieces of scheduling information; all or some intra-group UEs may correspond to different pieces of UL grant information in accordance with a pre-set rule respectively, e.g., correspond in an ascending order of UE-ID or correspond randomly; or, the UL grant information may be a UL grant, and all or some intra-group UEs needing to be awakened may correspond to UL grants allocated thereto in accordance with a pre-set rule respectively; for example, if resource allocation in the UL grant is Physical Resource Bearer (PRB) #0-3, each UE may determine resources allocated to the UE according to the own number; for example, UE #1 corresponds to PRB #4-7 or corresponds randomly, and the remaining UE information such as a Modulation and Coding Scheme (MCS) may be identical to the UL grant.

Or, in step 2, the eNB may also send M RARs.

Herein, each RAR may be scrambled by using different RA-RNTIs. A UE may determine an RA-RNTI according to an own UE-ID and a pre-set rule to descramble a CRC of DCI, and receive a corresponding RAR. For example, an RA-RNTI of a UE of which a UE-ID is UE #0 may be determined according to a time-frequency resource for sending a preamble, and UE #1, UE #2, UE # n sequentially correspond to RA-RNTI+1, RA-RNTI+2, . . . , RA-RNTI+n; or, UEs with different numbers may also correspond to any one of RA-RNTI+1, RA-RNTI+2, . . . , RA-RNTI+n.

In step 3, all or some intra-group UEs (all or some of the UEs refer to all or some UEs required to be awakened by the eNB) send a message (Msg) 3 over resources corresponding to own UL grants respectively.

In step 4, the eNB sends an Msg 4 as for the Msg 3 sent in step 3.

It is important to note that receiving of an RAR in this manner is relatively important, and in order to avoid missing detection of the RAR by the UE, the RAR may be re-sent within a window.

Under the condition that some UEs do not receive RARs successfully, the eNB may re-send a call message to notify these UEs of access.

Manner 2:

In step 1, the one or more UEs initiating a random access send a preamble over the time-frequency resource.

In step 2, after receiving the preamble, the eNB sends an RAR, the RAR carrying TA information, a TC-RNTI and a UL grant.

In step 3, all or some intra-group UEs (all or some of the UEs refer to all or some UEs required to be awakened by the eNB) monitor the RAR, so as to obtain the TA and the TC-RNTI.

In step 4, one or more UEs send an Msg 3. One or more UEs here may be the one or more UEs sending the preamble in step 1 or a pre-set UE (such as a UE having the smallest UE ID) in the UEs, the sent Msg 3 carries a group ID or a pre-set value, and the pre-set value may be shared by intra-group UEs.

In step 5, the eNB sends an Msg 4 carrying a group ID, the Msg 4 is scrambled by using the TC-RNTI, and the Msg 4 may further include or may not include M−1 C-RNTIs. Under the condition that the Msg 4 includes M−1 C-RNTIs, all or some intra-group UEs (all or some of the UEs refer to all or some UEs required to be awakened by the eNB) may select a TC-RNTI as an own C-RNTI according to an own intra-group number. For example, a UE numbered as UE #5 corresponds to a fifth TC-RNTI; or, the UE may also randomly select a TC-RNTI as an own C-RNTI. Under the condition that the Msg 4 does not contain a TC-RNTI, all or some intra-group UEs may calculate a C-RNTI as an own C-RNTI according to an own intra-group number in accordance with a pre-set formula. For example, a UE numbered as UE #5 may add 5 to a TC-RNTI for scrambling a CRC of DCI for scheduling the Msg 4, so as to obtain an own C-RNTI; or, the UE may also randomly select a TC-RNTI from TC-RNTI1, . . . , TC-RNTI+M−1 to serve as an own C-RNTI. In an embodiment, the Msg 4 may further include one or M pieces of radio resource configuration information such as a Channel Quality Indicator (CQI) feedback resource and an SR resource. Under the condition that the Msg 4 includes M pieces of radio resource configuration information, all or some intra-group UEs may select a set of radio resource configuration information as own radio resource configurations according to own intra-group numbers. The selection manner here may be similar to the above-mentioned TC-RNTI selection manner. Under the condition that the Msg 4 includes one piece of radio resource configuration information, all or some intra-group UEs may obtain own radio resource configurations according to own intra-group numbers in accordance with a pre-set formula. For example, the radio resource configurations include an SR configuration, so the UE numbered as UE #5 may consider that the own SR configuration is SR configuration+5 included in the radio resource configuration; or, SR configurations corresponding to different UEs may also be determined by using a random selection manner.

Receiving of an RAR and an Msg 4 in this manner is relatively important, and in order to avoid missing detection of the RAR and the Msg by the UE, the RAR and the Msg 4 may be repeatedly sent within a window respectively.

Manner 3

In step 1, the one or more UEs send a preamble over the time-frequency resource.

In step 2, the eNB sends an RAR, the RAR carrying TA information, M TC-RNTIs and a UL grant.

All or some intra-group UEs (when some UEs therein are awakened to initiate a random access) may monitor the RAR, so as to obtain the TA and the TC-RNTI.

The one or more UEs sending the preamble in step 1 or a pre-set UE (such as a UE having the smallest UE ID) in the UEs may send an Msg 3, carrying a group ID or a pre-set value.

In step 3, the eNB sends an Msg 4, the Msg 4 carries a group ID or the pre-set value, and the UE monitors the Msg 4.

In an embodiment, the eNB may send an Msg 4, the Msg 4 may be scrambled by using a TC-RNTI in the Msg 3, and contains one or M sets of radio resources (or may continuously carry multiple TC-RNTIs). The UE may determine a C-RNTI and radio resources allocated thereto in accordance with a manner similar to Manner 2; or, the eNB may send multiple messages 4 (Msg 4) which are scrambled by using M TC-RNTIs respectively, and the UE may randomly select a TC-RNTI according to an own number and receive an Msg 4 scheduled by DCI that is scrambled by the TC-RNTI.

Under the condition that some UEs do not receive the RAR successfully, the eNB may re-page these UEs to perform access.

EXAMPLE 3

Example 3 shows a method for access contention of a group of UEs. The example includes the steps as follows.

In step 501, one or more UEs in a UE group send a preamble to an eNB over a time frequency domain resource periodically, so as to initiate a random access to the eNB, herein the UE sending the preamble may be one of the following:

(1) one or more fixed UEs, herein for example, a UE numbered as 0 may be pre-specified to send a preamble, or a UE in the UE group, numbered as an even number, may be pre-specified to send a preamble, or all UEs may be specified to send a preamble; and (2) a certain or some UEs determined in accordance with a pre-set rule, herein for example, a UE for sending a preamble is determined according to the number of a UE for sending a preamble and a subframe number of a subframe receiving physical layer signaling or high-layer signaling; for example, if an odd subframe receives the signaling, a UE numbered as an odd number sends a preamble, and if an even subframe receives the signaling, a UE numbered as an even number sends a preamble.

A sending period and an offset of a subframe sending a preamble may be pre-set according to practical requirements, and the set sending period and the set offset of the subframe sending the preamble may be shared by all intra-group UEs.

There may be two situations during initiation of a random access. The first situation is that intra-group UE services are identical, and each access is access of the whole group. The second situation is that only some intra-group UEs need to be accessed during each access. The number of UEs accessed under the second situation may be random.

In an embodiment, the random access may be implemented via the following three manners.

Manner 1:

In step 1, the one or more UEs initiating a random access send a pre-set preamble over a pre-set time-frequency resource, the preamble resource corresponding to a group ID.

In step 2, after the eNB receives the preamble, the eNB learns of that the UE is representative of a group of UEs to be accessed via a PRACH resource (time-frequency resource information or preamble information) sent by the UE, and then the eNB sends an RAR, the RAR carrying a TA and at least one of the following information:

(1) TC-RNTI information, herein in an embodiment, the TC-RNTI information may include M TC-RNTIs, where M is the number of intra-group UEs, or the number of UE needing to initiate a random access, or a pre-set value; before this step, the preamble sent by the UE and the time-frequency resource for sending the preamble are in one-to-one correspondence to the UE group, and the eNB knows information about the UE group in advance, such as the number of UEs in the UE group, so the eNB may determine the UE group initiating a random access via the received preamble and time-frequency resource information, so as to determine the information about the UE group, thereby obtaining the number M of UEs in the UE group; or M may be a pre-set value; besides, the UE may also carry the number M of UEs in this group or the number M of UEs needing to initiate a random access in the UE group or a pre-set value M when sending the preamble; the M TC-RNTIs may be in a form of absolute value namely a 16 bit C-RNTI, or may be an absolute value of a C-RNTI and relative values of M−1 C-RNTIs relative to the absolute value, and therefore when receiving the TC-RNTI information, all or some UEs needing to initiate a random access in the UE group may determine own TC-RNTIs in accordance with a pre-set rule respectively, e.g., sequentially correspond to different TC-RNTIs in an ascending order of UE-ID or correspond to TC-RNTIs randomly; or, the TC-RNTI information may be a TC-RNTI, and all or some intra-group UEs may correspond to TC-RNTI, TC-RNTI+1, TC-RNTI+2, ..., TC-RNTI+M−1 in accordance with a pre-set rule respectively, e.g., correspond in an ascending order of UE-ID or correspond randomly;

(2) UL grant information, herein for example, the UL grant information may be M pieces of independent UL grant information or may be UL grant information containing M pieces of scheduling information; all or some intra-group UEs may correspond to different pieces of UL grant information in accordance with a pre-set rule respectively, e.g., correspond in an ascending order of UE-ID or correspond randomly; or, the UL grant information may be a UL grant, and all or some intra-group UEs needing to perform a random access may correspond to UL grants allocated thereto in accordance with a pre-set rule respectively; for example, if resource allocation in the UL grant is PRB #0-3, each UE may determine resources allocated to the UE according to the own number; for example, UE #1 may correspond to PRB #4-7 or may correspond randomly, and the remaining UE information such as an MCS may be identical to the UL grant.

Or, in step 2, the eNB may also send M RARs.

Herein, each RAR may be scrambled by using different RA-RNTIs. A UE may determine an RA-RNTI according to an own UE-ID and a pre-set rule to descramble a CRC of DCI, and may receive a corresponding RAR. For example, an RA-RNTI of a UE of which a UE-ID is UE #0 is determined according to a time-frequency resource for sending a preamble, and UE #1, UE #2, UE # n sequentially correspond to RA-RNTI+1, RA-RNTI+2, ..., RA-RNTI+n; or, UEs with different numbers may also correspond to any one of RA-RNTI+1, RA-RNTI+2, ..., RA-RNTI+n.

In step 3, all or some intra-group UEs (all or some UEs needing to perform a random access) send an Msg 3 over resources corresponding to own UL grants respectively.

In step 4, the eNB sends an Msg 4 according to the received Msg 3, herein the number of the Msg 4 may be identical to the number of the Msg 3 received by the eNB.

Receiving of an RAR in this manner is relatively important, and in order to avoid missing detection of the RAR by the UE, it may be considered that the RAR is repeatedly sent within a window.

In case of an access failure, this group of UEs may re-initiate an access, or may be accessed in accordance with a manner in the related art, i.e., a single UE initiates a random access.

Manner 2:

In step 1, the one or more UEs initiating a random access send a pre-set preamble over a pre-set time-frequency resource, the preamble resource corresponding to a group ID.

In step 2, after the eNB receives the preamble, the eNB learns of that the UE is representative of a group of UEs to be accessed via a PRACH resource (time-frequency resource information or preamble information) sent by the UE, and then the eNB sends an RAR, the RAR carrying information such as a TA and a TC-RNTI.

In step 3, all or some UEs (UEs needing to perform a random access) in the UE group monitor the RAR, so as to obtain the TA and the TC-RNTI.

In step 4, one or more UEs send an Msg 3. One or more UEs here may be the one or more UEs sending the preamble in step 1 or a pre-set UE (such as a UE having the smallest UE ID) in the UEs, and the sent Msg 3 may carry a group ID.

In step 5, the eNB sends an Msg 4 carrying a group ID, the Msg 4 is scrambled by using the TC-RNTI, and the Msg 4 may further include or may not include M−1 C-RNTIs. In an embodiment, the Msg 4 may further include one or M pieces of radio resource configuration information such as a CQI feedback resource and an SR resource. A UE may determine a C-RNTI and radio resource allocation information allocated thereto according to a manner similar to Manner 2 in the Second Embodiment.

Receiving of an RAR and an Msg 4 in this manner is relatively important, and in order to avoid missing detection of the RAR and the Msg by the UE, it may be considered that the RAR and the Msg 4 are repeatedly sent within a window respectively.

Manner 3

In step 1, the one or more UEs send a pre-set preamble over a pre-set time-frequency resource, the preamble resource corresponding to a group ID.

In step 2, the eNB learns of that the UE is representative of a group of UEs to be accessed via a PRACH resource (time-frequency resource information or preamble information) sent by the UE, and then the eNB sends an RAR, the RAR carrying information such as TAs and M TC-RNTIs.

In step 3, all or some intra-group UEs (all or some of the UEs refer to UEs needing to perform a random access) monitor the RAR, so as to obtain TAs and TC-RNTIs.

In step 4, the one or more UEs sending the preamble in step 1 or a pre-set UE (such as a UE having the smallest UE ID) in the UEs send an Msg 3, the Msg 3 carries a group ID, the Msg 3 is scrambled by using a TC-RNTI, and the TC-RNTI may be the first TC-RNTI in the TC-RNTIs obtained in step 3.

In step 5, the eNB sends an Msg 4, and all or some intra-group UEs (all or some of the UEs refer to UEs needing to perform a random access) monitor the Msg 4. The Msg 4 may be one of the following:

a. an Msg 4 scrambled by using a TC-RNTI in the Msg 3, herein the Msg 4 may carry a group ID, may further contain one or M sets of radio resources, and may continuously carry more of the M TC-RNTIs in step 2; in an embodiment, the Msg 4 may further include one or M pieces of radio resource configuration information such as a CQI feedback resource and an SR resource; the UE receiving the Msg 4 may determine a C-RNTI and radio resource allocation information allocated thereto according to a manner similar to Manner 2 in the Second Embodiment;

b. the monitored Msg 4 may be multiple messages 4 (Msg 4) which may be scrambled by using M TC-RNTIs, may carry group IDs and may support a Hybrid Automatic Repeat reQuest (HARQ), so that in this case, each UE may perform feedback for the corresponding Msg 4 and send an ACK message, and therefore resource waste can be avoided; in this case, if the eNB does not receive an ACK message sent by a UE, it may be regarded that this set of resources is not used by any UE.

In the above-mentioned three manners, in case of an access failure of a UE, this group of UEs may re-initiate a random access, or access of a corresponding UE may be implemented in accordance with a manner in the related art, i.e., a single UE initiates a random access independently.

Further, if two UEs select the same radio resource (including C-RNTIs, radio air interface resources and the like), uplink data sent by the UEs may always collide, thereby causing a sending failure. If finding that these UEs always fail in transmission, the eNB may send indication signaling to instruct them to re-initiate an access.

If the number of UEs correctly receiving an Msg 4 is smaller than the number of radio resources allocated by the eNB, waste will be caused. A UE may send information to indicate that it occupies a certain set of resources, and if the eNB does not receive the information about the certain set of resources, the eNB will consider that this set of resources is not occupied by any UE. For example, a time window may be defined, a UE sends indication information within the time window to indicate that it occupies this set of resources (TC-RNTIs and radio resources), the indication information may be an SR, an ACK or the like, and if the eNB does not receive the indication information, the eNB considers that this set of resources is wasted and can be shared by other UEs.

EXAMPLE 4

Example 4 shows a method for access contention of a group of UEs. In this example, UEs in a UE group may communicate with one another. In an embodiment, the intra-group UEs may interact mutually by using a short-distance communication manner such as Wireless Fidelity (WIFI) and D2D.

In this example, when intra-group members need to initiate a random access, the group members report it to a first UE (hereinafter referred to as a group leader), the group leader may be accessed in accordance with a certain period such as 100 ms, and if all the UEs do not have a random access request within 100 ms, an access may not be initiated. If one or more UEs have a random access request, the group leader may initiate a random access. Or, the group leader may initiate a random access when random access requests are accumulated to reach a certain number. The group leader may be pre-set, or may be a fixed UE with a certain ID number such as a fixed UE with an ID number 0, or may be determined as a UE in the UE group in accordance with a certain rule. Or, UEs with the same service type are probably gathered in a group. In this case, these UEs will initiate a random access at a fixed time, so that a group leader may be representative of the whole group of UEs to initiate a random access at a fixed time.

A process of allowing a group leader to be representative of the whole group of UEs or some UEs to perform a random access is provided hereinbelow in Manner 1 to Manner 3.

Manner 1:

In step 1, a group leader sends a preamble over a specified time-frequency resource.

In step 2, by means of a PRACH resource (time-frequency resource information or preamble information) sent by a UE, an eNB learns of that the UE is the group leader, and sends an RAR, the RAR carrying information such as a TA and a TC-RNTI.

In step 3, the group leader sends an Msg 3, the Msg 3 carrying the number M of intra-group UEs needing to perform a random access.

In step 4, the eNB sends an Msg 4, the Msg 4 is scrambled by using the TC-RNTI, and the Msg 4 may include or may not include M−1 C-RNTI values or M−1 difference values with the TC-RNTI. In an embodiment, the Msg 4 may further include one or M sets of radio resource configuration information such as a CQI feedback resource and an SR resource.

In step 5, the group leader notifies UEs having a random access requirement of these pieces of information, herein notification may adopt a broadcast manner or a unicast manner and will not be limited here.

Manner 2:

In step 1, a group leader sends a preamble over a certain time-frequency resource, a PRACH resource corresponding to the number M of UEs needing to perform a random access, or, the number of random access requests known to an eNB.

In step 2, by means of the PRACH resource (time-frequency resource information or preamble information) sent by the UE sending the preamble, the eNB learns of that the UE is the group leader, and sends an RAR, the RAR carrying information such as a TA and a TC-RNTI.

In step 3, the group leader sends an Msg 3.

In step 4, the eNB sends an Msg 4, the Msg 4 is scrambled by using the TC-RNTI, and the Msg 4 may include or may not include M−1 C-RNTI values or M−1 difference values with the TC-RNTI. The other allocated TC-RNTIs may be obtained in accordance with a pre-set rule. For example, the TC-RNTIs may be TC-RNTI, TC-RNTI+1, . . . , TC-RNTI+M+1. In an embodiment, the Msg 4 may further include one or M sets of radio resource configuration information such as a CQI feedback resource and an SR resource. If there is a set of radio resource configuration information, the other allocated radio resources may be obtained in accordance with a pre-set rule.

The group leader may notify UEs having an SR of these pieces of information in a broadcast manner or a unicast manner, which will not be limited here.

Manner 3:

In step 1, a group leader sends a preamble over a certain time-frequency resource, a PRACH resource corresponding to the number M of UEs needing to perform a random access, or, the number of random access requests known to an eNB.

In step 2, by means of the PRACH resource (time-frequency resource information or preamble information) sent by the UE, the eNB learns of that the UE is the group leader, and sends an RAR, the RAR carrying information such as a TA and M TC-RNTIs.

In step 3, the UE sends an Msg 3, the Msg 3 being scrambled by using one of the M TC-RNTIs.

In step 4, the eNB sends an Msg 4, the Msg 4 is scrambled by using the TC-RNTI in step 3, and the Msg 4 may include one or more sets of radio resources (or may continuously carry M TC-RNTIs).

Manner 4:

In this manner, group members know a PRACH resource (including a time-frequency resource and a preamble) sent by a group leader via short-distance communications, so as to obtain an RA-RNTI.

A random access implementing process includes the steps as follows.

In step 1, the group leader sends a preamble over a certain time-frequency resource, a PRACH resource corresponding to the number M of UEs needing to perform a random access.

In step 2, by means of the PRACH resource (time-frequency resource information or preamble information) sent by the UE, the eNB learns of that the UE is the group leader, and sends an RAR, the RAR carrying TA information, TC-RNTI information and UL grant information, similar to Manner 1 in the Second Embodiment here.

In step 3, intra-group UEs having an access request send messages (Msg 3) over resources corresponding to own UL grants respectively.

In step 4, the eNB sends an Msg 4 according to the received Msg 3, the number of the Msg 4 being identical to the number of the Msg 3 received by the eNB.

In this example, in order to avoid missing detection of an RAR by the UE, the eNB may repeatedly send the RAR within a window.

Manner 5

In this manner, group members know a PRACH resource (including a time-frequency resource and a preamble) sent by a group leader via short-distance communications, so as to obtain an RA-RNTI.

A random access process includes the steps as follows.

In step 1, the group leader sends a preamble over a certain time-frequency resource.

In step 2, by means of the received PRACH resource (time-frequency resource information or preamble information), the eNB learns of that the UE sending the PRACH resource is the group leader, and sends an RAR, the RAR carrying information such as a TA and a TC-RNTI.

In step 3, all UEs or intra-group UEs having an access request monitor the RAR, so as to obtain the TA and the TC-RNTI.

In step 4, after monitoring the RAR, the group leader UE sends an Msg 3, carrying a group ID or a pre-set value and the number M of intra-group UEs needing to perform a random access. The group ID or the pre-set value may be notified by the group leader, or may be notified by a network side, or may be pre-set.

In step 5, the eNB sends an Msg 4, the Msg 4 carries the group ID or the pre-set value in the previous step, the Msg 4 is scrambled by using the TC-RNTI, and the Msg 4 may further include M−1 C-RNTI values and one or more sets of radio resource configuration information. All UEs or UEs having an access request in the UE group may monitor the Msg 4 scrambled by using the TC-RNTI, and obtain own C-RNTIs and radio resource configuration information in accordance with a pre-set rule.

Before this manner is implemented, group member UEs may know the PRACH resource (time frequency and preamble) sent by the group leader UE, so as to obtain an RA-RNTI. Receiving of an RAR and an Msg 4 in this manner is relatively important, and in order to avoid missing detection of the RAR and the Msg by the UE, it may be considered that the RAR and the Msg 4 are repeatedly sent within a window respectively.

Manner 6:

Group member UEs know a PRACH resource (including a time-frequency resource and a preamble) sent by a group leader UE, so as to obtain an RA-RNTI.

A random access process in this example includes the steps as follows.

In step 1, a UE sends a preamble over a certain time-frequency resource, a PRACH resource corresponding to the number M of UEs needing to perform a random access or the number of random access requests known to an eNB.

In step 2, by means of the received PRACH resource (time-frequency resource information or preamble information), the eNB learns of that the UE is a group leader, and sends an RAR, the RAR carrying information such as a TA and a TC-RNTI.

In step 3, intra-group UEs having an access request monitor the RAR, so as to obtain the TA and the TC-RNTI.

In step 4, the group leader sends an Msg 3, carrying an ID known to all intra-group UEs.

In step 5, after receiving the Msg 3, the eNB sends an Msg 4, the Msg 4 is scrambled by using the TC-RNTI, and the Msg 4 contains M−1 C-RNTI values or M−1 difference values with the TC-RNTI, and includes one or M sets of radio resources.

In step 6, all UEs in the UE group or intra-group UEs having an access request monitor the Msg 4 scrambled by using the TC-RNTI, and obtain own C-RNTIs and radio resource configuration information in accordance with a pre-set rule or a random manner.

Manner 7:

Group member UEs know a PRACH resource (including a time-frequency resource and a preamble) sent by a group leader UE, so as to obtain an RA-RNTI.

A random access process in this manner includes the steps as follows.

In step 1, a UE sends a preamble over a certain time-frequency resource, a PRACH resource corresponding to the number M of UEs needing to perform a random access or the number of random access requests known to an eNB.

In step 2, by means of the received PRACH resource (time-frequency resource information or preamble information), the eNB learns of that the UE sending the PRACH resource is a group leader, and sends an RAR, the RAR carrying information such as a TA and multiple TC-RNTIs.

In step 3, the group leader sends an Msg 3 by using a TC-RNTI, carrying a group ID or a pre-set value.

In step 4, after receiving the Msg 3, the eNB sends an Msg 4, the Msg 4 may be a message scrambled by using the TC-RNTI in the Msg 3, and the Msg 4 may contain one or M sets of radio resources (or may continuously carry multiple TC-RNTIs). All UEs or intra-group UEs having an access request may monitor the Msg 4 scrambled by using the TC-RNTI, and obtain own C-RNTIs and radio resource configuration information in accordance with a pre-set rule.

Or, the eNB may also send multiple messages (Msg 4) which are scrambled by using multiple TC-RNTIs respectively. All UEs or intra-group UEs having an access request may determine own C-RNTIs in accordance with a pre-set rule or a random manner, and receive the Msg 4 corresponding to the C-RNTIs.

If two UEs select the same radio resource (including C-RNTIs, radio air interface resources and the like), uplink data sent by the UEs may always collide, thereby causing a sending failure. If finding that these UEs always fail in transmission, the eNB may send indication signaling to instruct them to re-initiate an access.

If the number of UEs correctly receiving an Msg 4 is smaller than the number of radio resources allocated by the eNB, waste will be caused. A UE may send information to indicate that it occupies a certain set of resources, and if the eNB does not receive the information about the certain set of resources, the eNB will consider that this set of resources is not occupied by any UE. For example, a time window may be defined, a UE sends indication information within the time window to indicate that it occupies this set of resources (TC-RNTIs and radio resources), the indication information may be an SR, an ACK or the like, and if the eNB does not receive the indication information, the eNB considers that this set of resources is wasted and can be shared by other UEs.

Fourth Embodiment

Figure 5:
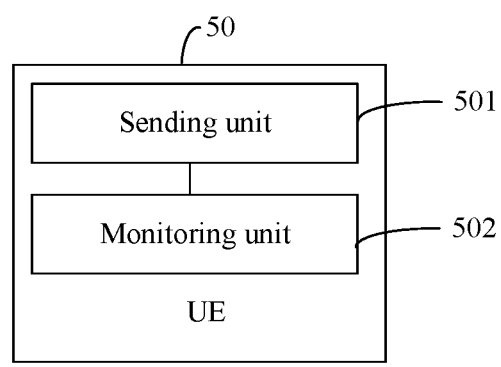
FIG. 5 illustrates a structure diagram of a UE according to an embodiment of the disclosure.

On the basis of the same technical thought of the above-mentioned embodiments, FIG. 5 shows a UE 50 according to an embodiment of the disclosure. The UE may include: a sending unit 501 and a monitoring unit 502, herein the sending unit 501 is configured to: send a preamble to an eNB over a time-frequency resource, the time-frequency resource including a time domain resource and a frequency domain resource; and the monitoring unit 502 is configured to: monitor an RAR corresponding to the preamble and sent by the eNB.

Figure 6:
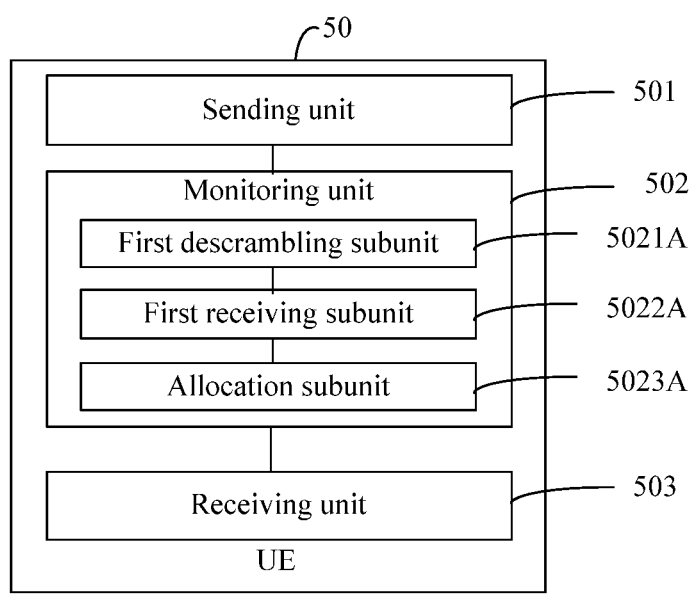
FIG. 6 illustrates a structure diagram of another UE according to an embodiment of the disclosure.

Exemplarily, referring to FIG. 6, the monitoring unit 502 may include: a first descrambling subunit 5021A, a first receiving subunit 5022A and an allocation subunit 5023A, herein, the first descrambling subunit 5021A is configured to: descramble a CRC of DCI for scheduling the RAR according to a pre-set RA-RNTI or an RA-RNTI corresponding to the preamble;

the first receiving subunit 5022A is configured to: receive the RAR, the RAR including at least one TC-RNTI and/or at least one UL grant; and the allocation subunit 5023A is configured to: determine a TC-RNTI and/or UL grant allocated to the UE according to at least one TC-RNTI and/or at least one UL grant included in the RAR.

In an embodiment, the allocation subunit 5023A is configured to: determine a TC-RNTI and/or a UL grant allocated to the UE according to an own ID of the UE in accordance with a pre-set rule.

Figure 7:
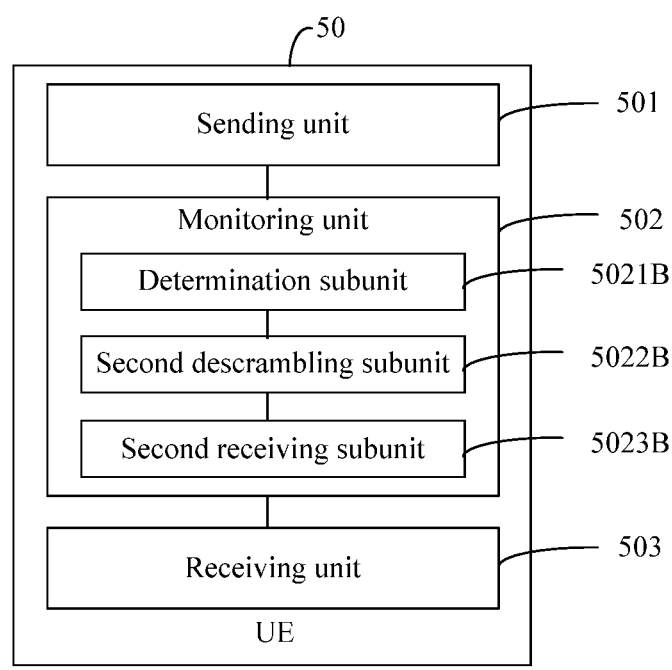
FIG. 7 illustrates a structure diagram of a further UE according to an embodiment of the disclosure.

Exemplarily, referring to FIG. 7, the monitoring unit 502 may include: a determination subunit 5021B, a second descrambling subunit 5022B and a second receiving subunit 5023B, herein, the determination subunit 5021B is configured to: determine corresponding RA-RNTIs of the UE according to respective IDs and/or preambles of the UE;

the second descrambling subunit 5022B is configured to: descramble a CRC of DCI for scheduling the RAR according to the corresponding RA-RNTIs of the UE; and the second receiving subunit 5023B is configured to: receive corresponding RARs of the UE, the RAR including a corresponding TC-RNTI and/or UL grant allocated to the UE.

In an embodiment, the sending unit 501 may be further configured to: send a message 3 according to the UL grant allocated to the UE.

In an embodiment, referring to FIG. 6 and FIG. 7, the UE 50 may further include a receiving unit 503, configured to: receive a message 4 sent by the eNB.

In an embodiment, receiving a message 4 sent by the eNB may include:

scrambling a CRC of DCI for scheduling the message 4 by using the TC-RNTI allocated to a first UE and/or a second UE.

In an embodiment, the message 4 may include at least one set of radio resources for the UE to determine radio resources allocated to the UE.

In an embodiment, the message 4 may include: a set of radio resources allocated to the corresponding UE.

Exemplarily, the sending unit 501 may be further configured to: send, to the eNB, an indicating signal for notifying the eNB of a successful access of the UE.

In an embodiment, the indicating signal may be an SR or an ACK signal.

In an embodiment, the receiving unit 503 may be further configured to: receive indicating information, sent by the eNB, for indicating re-initiation of a random access of the UE.

Exemplarily, the receiving unit 503 may be further configured to: receive DCI or a paging message or an RRC message sent by the eNB;

or, receive random access request information sent by the second UE.

In an embodiment, receiving DCI or a paging message or an RRC message sent by the eNB may include at least one of the following:

the DCI or a CRC of DCI for scheduling the paging message or the RRC message is scrambled by using a group ID of a UE group;

the DCI or the paging message or the RRC message includes the group ID of the UE group;

the DCI or the paging message or the RRC message includes an ID of the first UE and/or the second UE; and the DCI or the paging message or the RRC message includes an ID of a preamble and/or a time domain resource of a preamble and/or a frequency domain resource of a preamble.

Exemplarily, in an embodiment, the sending unit 501 is configured to: send a preamble over a frequency domain resource periodically.

In an embodiment, the message 3 and the message 4 may include the group ID of the UE group or a pre-set field.

In an embodiment, the message 3 may include a number of UEs having random access requests in the UE group or a number of UEs contained in the UE group or a pre-set UE number.

In an embodiment, the preamble and/or the time domain resource and/or the frequency domain resource correspond(s) to the number of UEs having random access requests in the UE group or the number of UEs contained in the UE group or the pre-set UE number.

Fifth Embodiment

Figure 8:
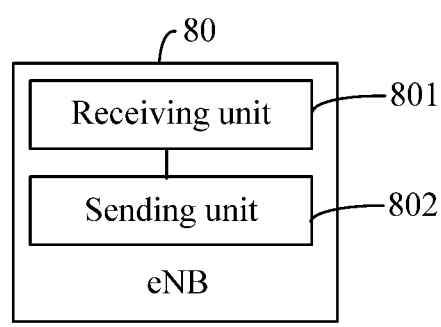
FIG. 8 illustrates a structure diagram of an eNB according to an embodiment of the disclosure.

On the basis of the same technical thought of the above-mentioned embodiments, FIG. 8 shows an eNB 80 according to an embodiment of the disclosure. The eNB may include: a receiving unit 801 and a sending unit 802, herein the receiving unit 801 is configured to: receive a preamble sent by a first UE in a UE group over a time-frequency resource, herein the time-frequency resource includes a time domain resource and a frequency domain resource, and the first UE is at least one UE in the UE group; and the sending unit 802 is configured to: send an RAR corresponding to the preamble.

Exemplarily, the RAR may include at least one TC-RNTI and/or at least one UL grant, the RAR may be used for the first UE and/or the second UE to determine a TC-RNTI and/or UL grant allocated thereto from at least one TC-RNTI and/or UL grant according to an ID of the first UE and/or the second UE in accordance with a pre-set allocation rule, and the second UE may be all or some UEs in the UE group.

Exemplarily, the RAR may include a TC-RNTI and/or a UL grant allocated to the first UE or second UE, and the second UE may be all or some UEs in the UE group.

In an embodiment, the receiving unit 801 may be further configured to: receive a message 3 sent by the first UE and/or the second UE according to the UL grant allocated thereto.

In an embodiment, the sending unit 802 may be further configured to: send a message 4 to the first UE and/or the second UE.

In an embodiment, sending a message 4 to the first UE and/or the second UE may include: scrambling a CRC of DCI for scheduling the message 4 by using the TC-RNTI allocated to the first UE and/or the second UE.

In an embodiment, the message 4 may include at least one set of radio resources for the first UE and/or the second UE to determine radio resources allocated thereto.

In an embodiment, the message 4 may include: a set of radio resources allocated to the first UE or second UE.

Exemplarily, the receiving unit 801 may be further configured to: receive an indicating signal, sent by the first UE and/or the second UE, for notifying the eNB of a successful access of the first UE and/or the second UE, the indicating signal being an SR or an ACK signal.

Exemplarily, the sending unit 802 may be further configured to: send, to the first UE and/or the second UE, indicating information for indicating re-initiation of a random access of the first UE and/or the second UE.

Exemplarily, the sending unit 802 may be further configured to: send DCI or a paging message or an RRC message to the first UE and/or the second UE.

In an embodiment, sending DCI or a paging message or an RRC message to the first UE and/or the second UE may include at least one of the following:

the DCI or a CRC of DCI for scheduling the paging message or the RRC message is scrambled by using a group ID of the UE group;

the DCI or the paging message or the RRC message includes a group ID of the UE group;

the DCI or the paging message or the RRC message includes an ID of the first UE and/or the second UE; and the DCI or the paging message or the RRC message includes an ID of a preamble and/or a time domain resource of a preamble and/or a frequency domain resource of a preamble.

Exemplarily, in an embodiment, the receiving unit 801 is configured to: receive a preamble sent by the first UE over a frequency domain resource periodically.

In an embodiment, the message 3 and the message 4 may include the group ID of the UE group or a pre-set field.

In an embodiment, the message 3 may include a number of UEs having random access requests in the UE group or a number of UEs contained in the UE group.

Besides, on the basis of the same technical thought of the above-mentioned embodiments, the embodiment of the disclosure also provides a random access system. The system includes a UE and an eNB, herein a first UE in a UE group is configured to: send a preamble to the eNB over a time-frequency resource, the time-frequency resource including a time domain resource and a frequency domain resource;

the first UE and/or a second UE in the UE group are/is configured to: monitor an RAR corresponding to the preamble and sent by the eNB, herein the first UE is at least one UE in the UE group, and the second UE is all or some UEs in the UE group; and the eNB is configured to: receive the preamble sent by the first UE in the UE group over the time-frequency resource, and send the RAR corresponding to the preamble.

Sixth Embodiment

The embodiment of the disclosure also provides a computer-readable storage medium, which stores a computer-executable instruction, herein when the computer-executable instruction is executed, the above-mentioned random access method is implemented.

A person skilled in the art shall understand that the embodiments of the disclosure may be provided as a method, a system or a computer program product. Thus, forms of hardware embodiments, software embodiments or embodiments integrating software and hardware may be adopted in the disclosure. Moreover, a form of the computer program product implemented on one or more computer available storage media (including, but are not limited to, a disk memory, an optical memory and the like) containing computer available program codes may be adopted in the disclosure.

The embodiments of the disclosure are described with reference to flowcharts and/or block diagrams of the method, the device (system) and the computer program product according to the embodiments of the disclosure. It will be appreciated that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flowcharts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flowcharts and/or one or more blocks of the block diagrams.

A person of ordinary skill in the art may understand that all or some of the steps of the above-mentioned embodiments may be implemented by using a computer program flow. The computer program may be stored in a computer-readable storage medium. The computer program is executed on a corresponding hardware platform (such as system, device, apparatus, instrument, and processor). During execution, the computer program includes one of the steps of the method embodiment or a combination thereof.

In an embodiment, all or some of the steps of the above-mentioned embodiments may also be implemented by using an integrated circuit. These steps may be manufactured into integrated circuit modules respectively, or a plurality of modules or steps therein are manufactured into a single integrated circuit module.

Each apparatus/function module/function unit in the above-mentioned embodiments may be implemented by using a general computation apparatus. They may be centralized on a single computation apparatus or may be distributed on a network composed of a plurality of computation apparatuses.

When being implemented in a form of software function module and sold or used as an independent product, each apparatus/function module/function unit in the above-mentioned embodiments may be stored in a computer-readable storage medium. The above-mentioned computer-readable storage medium may be a read-only memory, a magnetic disk or an optical disk.

A person of ordinary skill in the art may understand that the technical solutions of the present disclosure may be modified or equivalently replaced without departing from the spirit and scope of the technical solutions of the present disclosure. The scope of protection of the present disclosure refers to the scope defined by the claims.

INDUSTRIAL APPLICABILITY

The embodiments of the disclosure provide a random access method, device and system. One or more UEs in a UE group send a preamble to an eNB over a time-frequency resource, so as to instruct the eNB to execute random accesses of some or all UEs in the UE group. Thus, a group of UEs only needs to occupy a PRACH resource (including a time domain resource, a frequency domain resource and a preamble) in a random access, so that PRACH resources can be greatly saved, thereby meeting requirements for a huge number of machine communications.

The invention claimed is:

1. A random access method, comprising:
sending, by a first User Equipment (UE) in a UE group, a preamble to an evolved Node B (eNB) over a time-frequency resource, the time-frequency resource comprising a time domain resource and a frequency domain resource;
monitoring, by at least one of the first UE or a second UE in the UE group, a Random Access Response (RAR) corresponding to the preamble and sent by the eNB, wherein the first UE is at least one UE in the UE group, and the second UE is all or some UEs in the UE group; and
after monitoring, by at least one of the first UE or the second UE, the RAR corresponding to the preamble and sent by the eNB:
sending, by at least one of the first UE or the second UE, a message 3 according to a Uplink (UL) grant allocated thereto, wherein the message 3 comprises a number of UEs having random access requests in the UE group or a number of UEs contained in the UE group or a pre-set UE number.

2. The method according to claim 1, wherein the first UE is at least one of the following:
at least one fixed UE; or,
at least one UE determined according to a pre-set rule; or,
at least one UE notified by the eNB.

3. The method according to claim 1, wherein at least one of the preamble, the time domain resource or the frequency domain resource is pre-set, or determined by a group Identifier (ID) of the UE group, or notified by the eNB.

4. The method according to claim 3, wherein at least one of the preamble, the time domain resource or the frequency domain resource corresponds to the number of UEs having random access requests in the UE group or the number of UEs contained in the UE group or the pre-set UE number.

5. The method according to claim 1, wherein monitoring, by at least one of the first UE or the second UE, the RAR corresponding to the preamble and sent by the eNB comprises:
descrambling, by at least one of the first UE or the second UE, a Cyclic Redundancy Check (CRC) of Downlink Control Information (DCI) for scheduling the RAR according to a pre-set Random Access Radio Network Temporary Identity (RA-RNTI) or an RA-RNTI corresponding to the preamble, and receiving the RAR, the RAR comprising at least one of at least one Temporary Cell Radio Network Temporary Identity (TC-RNTI) or at least one Uplink (UL) grant; and
determining, by at least one of the first UE or the second UE, at least one of a TC-RNTI or UL grant allocated thereto according to at least one of at least one TC-RNTI or at least one UL grant contained in the RAR; or
monitoring, by at least one of the first UE or the second UE, the RAR corresponding to the preamble and sent by the eNB comprises:
determining, by at least one of the first UE or the second UE, corresponding RA-RNTIs according to at least one of respective IDs or preambles, descrambling a CRC of DCI for scheduling the RAR according to the corresponding RA-RNTIs, and receiving corresponding RARs, the RAR comprising at least one of a TC-RNTI or a UL grant allocated to the first UE or second UE.

6. The method according to claim 5, wherein determining, by at least one of the first UE or the second UE, at least one of the TC-RNTI or the UL grant allocated thereto according to at least one of at least one TC-RNTI or at least one UL grant contained in the RAR comprises:
  determining, by at least one of the first UE or the second UE, at least one of a TC-RNTI or a UL grant allocated thereto according to at least one of an ID of the first UE or the second UE in accordance with a pre-set rule.

7. The method according to claim 1, further comprising: after sending, by at least one of the first UE or the second UE, the message 3 according to the UL grant allocated thereto,
  receiving, by at least one of the first UE or the second UE, a message 4 sent by the eNB.

8. The method according to claim 7, wherein receiving, by at least one of the first UE or the second UE, the message 4 sent by the eNB comprises:
  scrambling a CRC of DCI for scheduling the message 4 by using a TC-RNTI allocated to at least one of the first UE or the second UE.

9. The method according to claim 8, wherein the message 4 comprises at least one set of radio resources, radio resources allocated to at least one of the first UE or the second UE are determined by at least one of the first UE or the second UE according to at least one set of radio resources in the message 4; or
  the message 4 comprises a set of radio resources allocated to the first UE or second UE.

10. The method according to claim 9, wherein the radio resources allocated to at least one of the first UE or the second UE are further determined by at least one of the first UE or the second UE according to an ID of at least one of the first UE or the second UE in accordance with a pre-set rule.

11. The method according to claim 7, further comprising: after receiving, by at least one of the first UE or the second UE, the message 4 sent by the eNB,
  sending, by at least one of the first UE or the second UE, an indicating signal for notifying the eNB of a successful access of at least one of the first UE or the second UE to the eNB,
  wherein the indicating signal is a Scheduling Request (SR) or an Acknowledgement (ACK) signal.

12. The method according to claim 7, further comprising: after receiving, by at least one of the first UE or the second UE, the message 4 sent by the eNB,
  receiving, by at least one of the first UE or the second UE, indicating information, sent by the eNB, for indicating re-initiation of a random access of at least one of the first UE or the second UE.

13. The method according to claim 7, wherein the message 3 and the message 4 comprise a group ID of the UE group or a pre-set field.

14. The method according to claim 1, further comprising: before sending, by the first UE in the UE group, the preamble over the time-frequency resource,
  receiving, by at least one of the first UE or the second UE, Downlink Control Information (DCI) or a paging message or a Radio Resource Control (RRC) message sent by the eNB; or,
  receiving, by the first UE, random access request information sent by the second UE.

15. The method according to claim 14, wherein receiving, by at least one of the first UE or the second UE, the DCI or the paging message or the RRC message sent by the eNB comprises at least one of the following:
  the DCI or a CRC of DCI for scheduling the paging message or the RRC message is scrambled by using a group ID of the UE group;
  the DCI or the paging message or the RRC message comprises a group ID of the UE group;
  the DCI or the paging message or the RRC message comprises an ID of at least one of the first UE or the second UE; or
  the DCI or the paging message or the RRC message comprises at least one of an ID of the preamble, the time domain resource of the preamble or the frequency domain resource of the preamble.

16. The method according to claim 14, further comprising: after receiving, by the first UE, the random access request information sent by the second UE,
  counting, by the first UE, received random access requests of the second UE in the UE group; and
  when a count reaches a pre-set threshold, sending, by the first UE, the preamble over the time-frequency resource.

17. The method according to claim 1, wherein sending, by the first UE in the UE group, the preamble over the time-frequency resource comprises:
  periodically sending, by the first UE, the preamble over the frequency domain resource.

18. A User Equipment (UE), comprising: a sending unit and a monitoring unit,
  wherein the sending unit is configured to: send a preamble to an evolved Node B (eNB) over a time-frequency resource, the time-frequency resource comprising a time domain resource and a frequency domain resource;
  the monitoring unit is configured to: monitor a Random Access Response (RAR) corresponding to the preamble and sent by the eNB; and
  the sending unit is further configured to: send a message 3 according to a Uplink (UL) grant allocated to the UE, wherein the message 3 comprises a number of UEs having random access requests in a UE group or a number of UEs contained in the UE group or a pre-set UE number.

* * * * *

(12) INTER PARTES REVIEW CERTIFICATE (3692nd)
United States Patent
Zhang et al.

(10) Number: US 10,448,430 K1
(45) Certificate Issued: Aug. 19, 2024

(54) GROUP BASED RANDOM ACCESS METHOD DEVICE AND SYSTEM

(71) Applicants: Wen Zhang; Shuqiang Xia; Bo Dai; Qian Dai; Zhaohua Lu; Kun Liu; Xianming Chen; Jing Shi; Xincai Li; Huiying Fang

(72) Inventors: Wen Zhang; Shuqiang Xia; Bo Dai; Qian Dai; Zhaohua Lu; Kun Liu; Xianming Chen; Jing Shi; Xincai Li; Huiying Fang

(73) Assignee: G+ COMMUNICATIONS LLC

Trial Number:

IPR2023-00441 filed Jan. 5, 2023

Inter Partes Review Certificate for:

Patent No.: 10,448,430
Issued: Oct. 15, 2019
Appl. No.: 15/738,233
Filed: Dec. 20, 2017

The results of IPR2023-00441 are reflected in this inter partes review certificate under 35 U.S.C. 318(b).

INTER PARTES REVIEW CERTIFICATE
U.S. Patent 10,448,430 K1
Trial No. IPR2023-00441
Certificate Issued Aug. 19, 2024

AS A RESULT OF THE INTER PARTES REVIEW PROCEEDING, IT HAS BEEN DETERMINED THAT:

Claims 1-15 and 17-18 are found patentable.

\* \* \* \* \*